(12) United States Patent
Tsantilis

(10) Patent No.: US 8,601,323 B2
(45) Date of Patent: Dec. 3, 2013

(54) ADVANCED MANAGEMENT OF RUNTIME ERRORS

(75) Inventor: Efstratios Tsantilis, Nussloch (DE)

(73) Assignee: SAP AG, Walldorf (DE)

(*) Notice: Subject to any disclaimer, the term of this patent is extended or adjusted under 35 U.S.C. 154(b) by 394 days.

(21) Appl. No.: 12/965,973

(22) Filed: Dec. 13, 2010

(65) Prior Publication Data

US 2012/0151278 A1    Jun. 14, 2012

(51) Int. Cl.
*G06F 11/00* (2006.01)
(52) U.S. Cl.
USPC .................................................. 714/42
(58) Field of Classification Search
USPC .......................................................... 714/45
See application file for complete search history.

(56) References Cited

U.S. PATENT DOCUMENTS

| | | | |
|---|---|---|---|
| 6,718,489 B1* | 4/2004 | Lee et al. | 714/43 |
| 6,757,837 B1* | 6/2004 | Platt et al. | 714/38.13 |
| 6,788,218 B2* | 9/2004 | Sudolcan | 340/870.16 |
| 7,278,058 B1* | 10/2007 | Narisi | 714/38.11 |
| 7,849,364 B2* | 12/2010 | Callender | 714/38.1 |
| 2004/0098640 A1* | 5/2004 | Smith | 714/39 |
| 2008/0126856 A1* | 5/2008 | Levidow et al. | 714/19 |
| 2009/0186596 A1* | 7/2009 | Kaltsukis | 455/404.2 |
| 2011/0191373 A1* | 8/2011 | Botros et al. | 707/776 |

* cited by examiner

*Primary Examiner* — Bryce Bonzo

(57) ABSTRACT

Systems and methods for advanced management of runtime errors are described herein. Based on a preference, a runtime error manager selects one or more error dumps generated in a computer system landscape. The runtime error manager filters one or more data portions from the selected error dumps. The filtered data portions are supplemented with additional information collected from the nodes of the computer system landscape, or received from external systems. The data portions and the supplemental data are used to assign users responsible to resolve one or more of the logged runtime errors. The data portions and the supplemental information are used to create and send notifications to the responsible users or to instantiate and manage workflows in behalf to the responsible users.

20 Claims, 13 Drawing Sheets

Dump Notification – B20 STRATOSTEST

| Variant | STRATOSTEST |
|---|---|
| System | B20 |
| Period | 2 hours |
| From | 02.12.2009 15:11:46 |
| To | 02.12.2009 17:11:46 |

Short Dump List

| Date | Time | User | Client | Reason | Program | Package | Package Responsible | Component | Owner |
|---|---|---|---|---|---|---|---|---|---|
| 02.12.2009 | 17:11:39 | SOSAYEPEZ | 000 | UNCAUGHT_EXCEPTION | SAPLWDR_RUNTIME_REPOSITORY | SWDP_RUNTIME_REPOSITORY | BREUERR | BC-WD-ABA-RUN | BUSTER |
| 02.12.2009 | 17:08:01 | IOSWIGC | 000 | OBJECTS_OBJREF_NOT_ASSIGNED | SAPLSEO_INH_NAVI | SFOE | | BC-DWB-TOO-CLA | SCHNEIDEMIC0 |
| 02.12.2009 | 17:07:39 | STEINBACHK | 000 | DYNPRO_SEND_IN_BACKGROUND | SAPMSSY0 | SABP_CORE | PRESTEL | BC-ABA-LA | KOCHU |
| 02.12.2009 | 17:05:00 | SAPSYS | 000 | CALL_FUNCTION_NOT_FOUND | SAPMSSY1 | SRCX | AGHADAVOODI | BC-MID-RFC | AGHADAVOODI |
| 02.12.2009 | 17:04:20 | SOSAYEPEZ | 000 | UNCAUGHT_EXCEPTION | CX_WDR_ADAPTER_EXCEPTION====CP | SWDP_RUNTIME_RENDERING | FEEKEN | BC-WD-ABA-REN | KLINGERU |
| 02.12.2009 | 17:04:18 | SOSAYEPEZ | 000 | UNCAUGHT_EXCEPTION | SAPLWDR_RUNTIME_REPOSITORY | SWDP_RUNTIME_REPOSITORY | BREUERR | BC-WD-ABA-RUN | BUSTER |
| 02.12.2009 | 17:04:16 | MATTHEE | 000 | UNCAUGHT_EXCEPTION | CL_WDR_CFG_CONTEXT_MODEL==CP | SWDP_CONFIGURATION | BREUERR | BC-WD-ABA | NAUNDORF |
| 02.12.2009 | 17:03:19 | CEJKA | 000 | DYNPRO_NOT_FOUND | SAPSPRINT_TEST_SUITE | SPOO | BOLLONI | BC-CCM-PRN | CEJKA |
| 02.12.2009 | 17:01:35 | SOSAYEPEZ | 000 | UNCAUGHT_EXCEPTION | SAPLWDR_RUNTIME_REPOSITORY | SWDP_RUNTIME_REPOSITORY | BREUERR | BC-WD-ABA-RUN | BUSTER |
| 02.12.2009 | 16:53:50 | SOSAYEPEZ | 000 | OBJECTS_OBJREF_NOT_ASSIGNED | CL_WD_TOOLBAR================CP | SWDP_UIEL_STANDARD | SIXT | BC-WD-ABA | KLINGERU |
| 02.12.2009 | 16:50:00 | SAPSYS | 000 | CALL_FUNCTION_NOT_FOUND | SAPMSSY1 | SRCX | AGHADAVOODI | BC-MID-RFC | AGHADAVOODI |
| 02.12.2009 | 16:49:25 | MATTHEE | 000 | UNCAUGHT_EXCEPTION | CL_WDR_CFG_CONTEXT_MODEL==CP | SWDP_CONFIGURATION | BREUERR | BC-WD-ABA | NAUNDORF |
| 02.12.2009 | 16:46:46 | UHRIG | 000 | UNCAUGHT_EXCEPTION | SAPLWDR_RUNTIME_REPOSITORY | SWDP_RUNTIME_REPOSITORY | BREUERR | BC-WD-ABA-RUN | BUSTER |
| 02.12.2009 | 16:44:36 | MATTHEE | 000 | UNCAUGHT_EXCEPTION | CL_CHIP_PAGE_TOOL_BASE====CP | SWDP_CCP_WD_API | MATTHEE | BC-WD-ABA | MATTHEE |

ADVANCED MANAGEMENT OF RUNTIME ERRORS

BACKGROUND

The ever growing complexity of modern information systems is often characterized by greater risk of malfunctions. Many computer systems show an increasing number of system and program errors through their lifecycle from initial development, through new releases, and until retirement. Moreover, the complexity of the encountered errors also grows. As a flip side of the same process, various tools for detecting and fixing computer system errors evolve in a similar pace. This tendency is especially true regarding software applications, and techniques to prevent, detect and correct programming problems. Undoubtedly, efficient error detection and bug fixing have measurable advantages. For example, a typical programming error would systematically propagate if not timely addressed, and would require bigger effort to fix, including remote communication, re-distribution of software packages, etc.

The earlier a software problem is detected, the fewer maintenance resources would be spent. Therefore, in a productive computer system environment, system errors should quickly lead to alerts when detected. Thus, the appropriate measures for analyzing and solving a detected problem could be executed as soon as possible. However, in many cases the appropriate measures to resolve a computer software problem are not timely taken due to various factors. For example, the problem is reported with significant delay, or the problem is not directly reported to a specialist or organization best suited to solve it, etc. Often, some software errors are tolerated and not reported at all in order to avoid tedious manual procedures, e.g., searching for relevant data in log files, describing the error and the circumstances, communicating the problem with maintenance specialists, etc.

SUMMARY

Various embodiments of systems and methods for advanced management of runtime errors are described herein. A number of error dumps are generated across a computer system landscape in response to a number of runtime errors encountered in the nodes of the computer system landscape. A runtime error manager is implemented in one or more of the nodes of the computer system landscape. In one aspect, the runtime error manager selects a subset of the generated error dumps based on a preference. From the selected error dumps, the runtime error manager filters one or more data portions. In another aspect, the data portions filtered from the error dumps are supplemented with additional information collected from the nodes of the computer system landscape, or received from external systems. The data portions and the supplemental data are used to assign users responsible to resolve one or more of the logged runtime errors. In yet another embodiment, notifications are sent to the responsible users based on the data portions and the supplemental information.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

FIG. 12 illustrates an example notification message communicated for a number of runtime errors, according to one embodiment.

DETAILED DESCRIPTION

Embodiments of techniques for advanced management of runtime errors are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

A common practice has been established in most advanced information systems to automatically generate error logs when a software problem occurs. Such logs alleviate both the error fixing process and the resolution of any data inconsistencies caused by the errors. The error logs can be described as a report about the malfunction situation. Usually, the error logs include the bulk of the necessary information for software developers to analyze the problem. For example, error logs may include programming code executed at the moment of error, a corresponding process call stack, current values of system variables, user action performed, etc. More data about an error situation may be derived based on the information in the error logs to further facilitate error fixing process. For example, the error log information may be used to find a competent or responsible person to notify about a particular problem.

Figure 1:
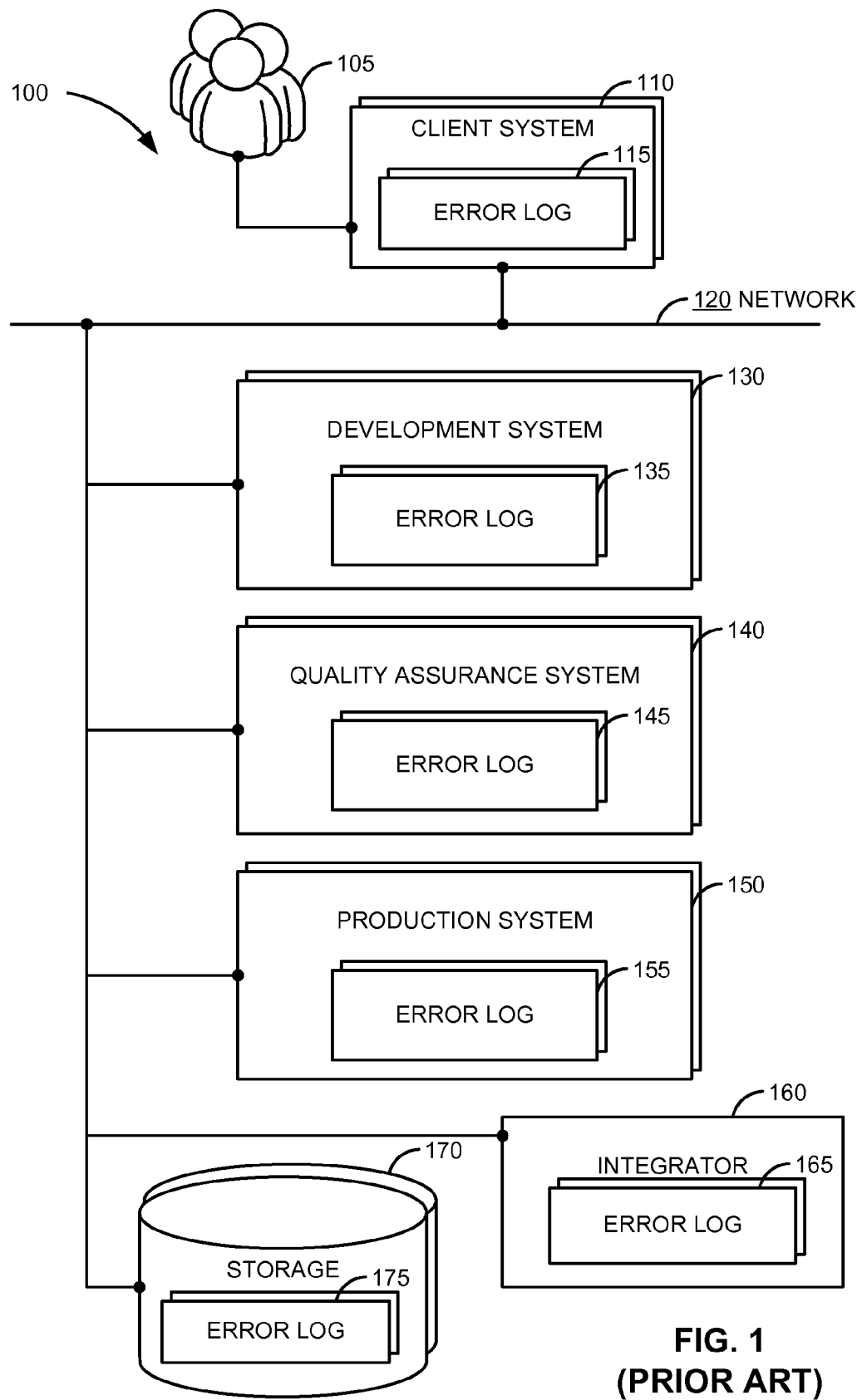
FIG. 1 is a block diagram illustrating a prior art computer system landscape.

In many cases, program malfunctions may occur in any of several systems in a computer system landscape. There are different definitions for a system landscape, but in general, a computer system landscape includes all computer systems deployed in a business or organizational entity to perform directly or indirectly related tasks. FIG. 1 shows computer system landscape 100, according to one embodiment. One or more users 105 operate one or more client systems 110 to access services provided by a number of backend systems via network 120 to perform various development or business related tasks.

The backend systems in system landscape 100 include development system 130, quality assurance system 140 and production system 150. Each of the backend systems 130, 140 and 150 may be presented by a single or multiple server system, for example organized as clusters. Storage system 170 may keep different kinds of data relevant to the computer systems in the system landscape 100, e.g., source codes, business data, metadata, etc. Integrator 160 may be utilized for synchronizing and managing the operation of the rest of the elements of the computer system landscape 100, e.g., for maintaining the lifecycle of the various software components, for ensuring communication between the backend systems 130, 140 and 150, for imposing landscape wide security policies, etc.

In an alternative embodiment, a computer system landscape may include one or more presentation server systems to provide user interface (UI) support, one or more application servers to execute software applications, and one or more database servers to store programs and business data. Whatever the structure of a particular computer system landscape is, errors may be encountered in any of the implemented computer systems. Respectively, error logs are potentially generated in more than one computer systems in the landscape. For example, whenever an error occurs in client system 110, corresponding error log 115 may be generated. Similarly, error logs 135, 145, 155, 165 and 175 may be generated in backend systems 130, 140 and 150, in the integrator system 160, and in the storage systems 170, respectively.

In one embodiment, error logs may be generated centrally in a computer system landscape, e.g., on a server directly accessible by responsible maintenance specialists. However, such organization is not always possible as, for instance, some of the errors may prevent communication between computer systems. Therefore, it is not an uncommon situation where maintenance specialists or software developers best suited to analyze and solve a problem do not have direct access to the relevant error reports. A great advantage would be if the error log information is automatically gathered from each system where a runtime error may occur, and transferred to the right specialist as quickly and as focused as possible. In one embodiment, a management mechanism for runtime errors is implemented in the computer system landscape that is able to do this job efficiently and is problem-centric.

Figure 2:
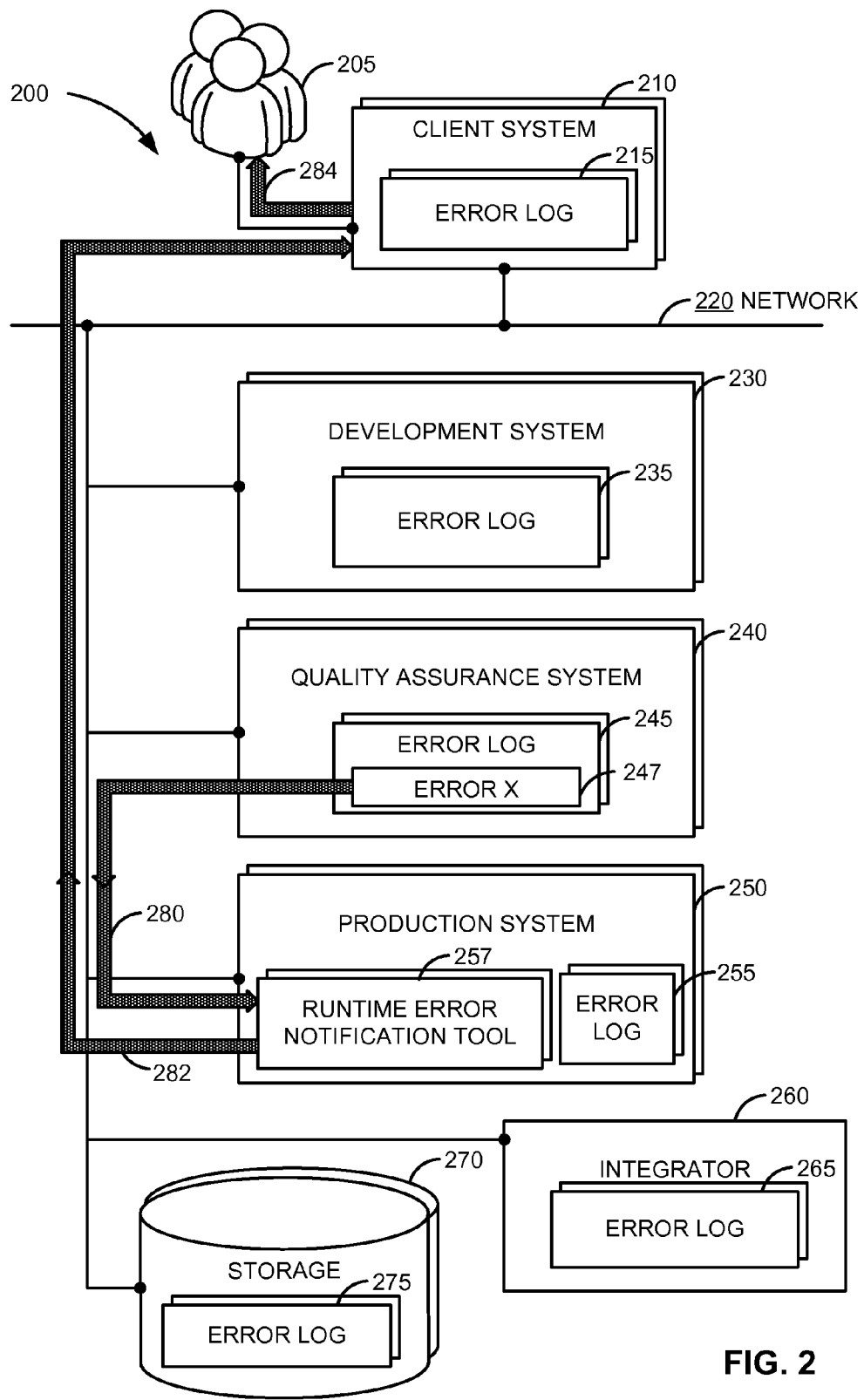
FIG. 2 is a block diagram illustrating computer system landscape, according to one embodiment.

FIG. 2 shows computer system landscape 200 where a runtime error handling mechanism is implemented, according to one embodiment. Runtime error manager 257 collects relevant error information from error logs 215, 235, 245, 255, 265 and 275 generated at nodes 210, 230, 240, 250, 260 and 270, respectively. Further, according to one embodiment, the runtime error manager 257 creates a report that may include additional information about the errors besides the information extracted from the error logs. Finally, the runtime error manager 257 sends the report to one or more of users 205 who are responsible for analyzing and fixing the encountered problem.

For example, an error "X" has occurred in the quality assurance system 240. The relevant information about error "X" 247 has been automatically collected in the quality assurance system 240 and stored in the error log 245. Depending on the implementation, a new error log 245 for the error "X" 247 may be created, or the relevant error information may be appended to an existing error log file 245.

Based on a predefined condition or event, the runtime error manager 257 extracts information about error "X" 247 from error log 245, as illustrated with arrow 280. The runtime error manager 257 automatically allocates one or more of the users 205 who are somehow responsible for the programming code associated with the error "X" 247. The runtime error manager 257 notifies the responsible one or more users 205, as illustrated with arrows 282 and 284.

In different embodiments, runtime error manager 257 may use different notification mechanisms built in the system landscape 200, e.g., messaging system, e-mail system, workflow mechanism, etc. The notification may include the error log information about error "X" 247, and may also include additional information relevant to the error "X" 247, extracted from one or more of the nodes 210, 230, 240, 250, 260 and 270 of the system landscape 200, by the runtime error manager 257. Depending on the embodiment, the runtime error manager 257 may be implemented in any one or more of the nodes 210, 230, 240, 250, 260 and 270 of the system landscape 200.

Figure 3:
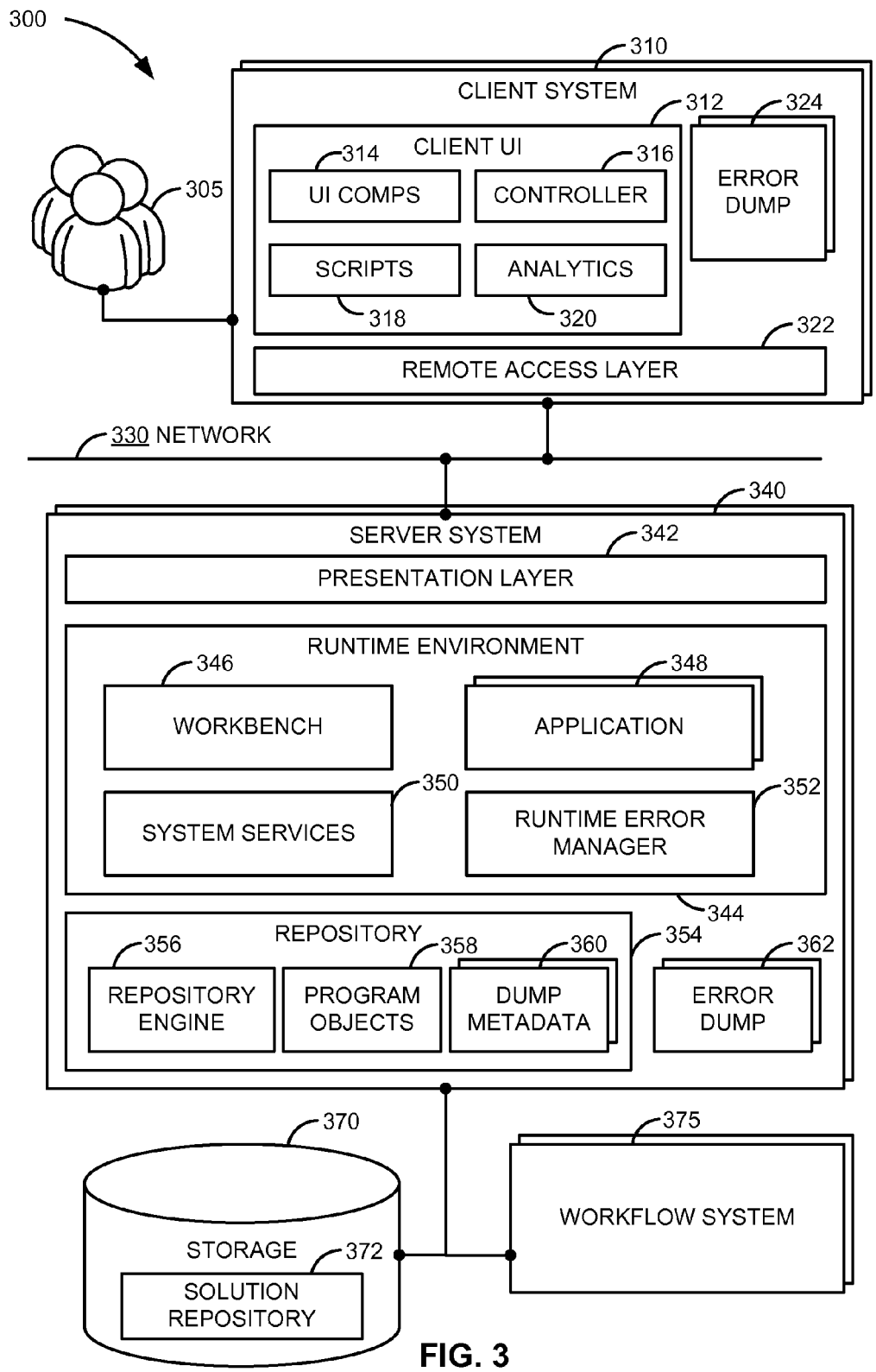
FIG. 3 is a block diagram illustrating computer system operating an advanced runtime error management mechanism, according to one embodiment.

FIG. 3 shows a computer system 300 where an advance runtime error management mechanism is operating, according to one embodiment. The computer system 300 is a rather simplified example of classic client-server architecture. A number of users 305 may request different operations through one or more client systems 310 via network 330 from a backend, e.g., one or more server systems 340. The server system 340 represents a backend node of the computer system landscape 300, and may be a development system, a quality assurance system, a production system, or other. Some of the elements of the computer systems in system landscape 300 resemble the structure and functionalities of software modules developed by SAP AG. However, structures with similar functionalities could be found in software products developed by other vendors as well. Alternative embodiments may utilize other kinds of computer system architectures.

In one embodiment, client system 310 may run a standalone client application to interact with the backend server system 340. Alternatively, an intermediate layer between the user and the server may be downloaded to a client computer as an extension of a running internet browser. The standalone client application or the intermediate browser extension takes responsibility for rendering the necessary client functionality and for communicating with the server system 340 via the network 330. The standalone client application and the intermediate layer may have similar components and functionality as illustrated in FIG. 3.

Client UI 312 module interprets the UI models and controls as designed and programmed in the software applications executed in the server system 340. In one embodiment, UI components module 314 instantiates one or more appropriate UI screens or controls, e.g., in response to user actions. The behavior of the UI components 314 is managed by controller 316. The controller 316 makes sure that all instantiated UI controls in the UI components 314 are initialized. The controller 316 is also responsible for handling any operation triggered by events corresponding to the instantiated UI controls. In case when some of the operations involve execution of script segments, the controller 316 may forward their execution to scripts module 318. For example, scripts module 318 may be a frontend scripting engine. Analytics module 320 may be used for frontend data processing when necessary.

The communication between the client UI 312 and the backend server system 340 is managed by remote access layer 322. Error dump 324 represents one or more log files created in the client system 310 in response to errors or malfunctions occurring at runtime. In one embodiment, the runtime errors of the client UI 312 are directly reported at the server system 340 and logged in error dumps created in the server system 340, e.g., error dump 362. However, when an error prevents communication between the client system 310 and the server system 340, e.g., when the remote access layer 322 fails, such an error can be timely logged only in the client system 310. The one or more error dumps 324 created at client system 310 may be reported to server system 340 for purposes of notification, analysis, error fixing, storing, etc.

Server system 340 may represent any of the backend systems in a computer system landscape, e.g., server system 340 may be a development system, a quality assurance system, a production system, or any combination of these systems. The server system 340 may have a single server or a multi-server architecture, e.g., a cluster of servers. Presentation layer 342 may handle the communication between runtime environment 344 of the server system 340 and the client UI modules 312 of the one or more client systems 310 operating in the computer system 300. For example, the presentation layer 342 may generate the UI object model underlying the UI controls instantiated in the UI components module 314 at the client systems 310. In one embodiment, presentation layer 342 is part of the runtime environment 344.

The runtime environment 344 executes a number of software applications. For example, one or more applications 348 may provide a number of business services for the users 305. Operation requests related to the business services are generated at one or more client systems 310. The operation requests are translated to different process related tasks performed by the applications 348 executed in the runtime environment 344.

In one embodiment, workbench 346 provides development environment to users 305 to create new, or change existing software applications. The users 305 may create, edit, test and organize application programs through the client UI 312. System services 350 in the runtime environment 344 may be used to administer the characteristics of the runtime environment 344, e.g., its engine parameters, the user access to its components, the processes execution, the communication with other runtime environments, like, external systems, databases, etc.

Runtime error manager 352 illustrates the advanced automated runtime error management mechanism as a computer program deployed and executed in the runtime environment 344. In one embodiment, runtime error manager 352 is separate from other mechanisms implemented in one or more of the nodes of the computer system landscape 300 for generating error dumps in response to software errors. For example, error dump 362 represents one or more log files generated when a software application or a system program in the server system 340 aborts or fails. Generating error dump 362 may be part of the functionality of the aborting application, part of the functionality of the runtime environment 344, handled by a separate agent program, etc.

Repository 354 is generally the place where metadata about the computer programs deployed in the server system 340 are preserved, according to one embodiment. There are different kinds of metadata that could be maintained by the repository 354, available to the programs executed in the runtime environment 344. For example, the repository 354 keeps the description of the programming objects 358 underlying the running applications 348. In one embodiment, the repository 354 may store associations between different deployed programming structures, and persons responsible for the development or maintenance of these structures. Repository engine 356 manages the metadata and the collaboration with the server runtime 344, according to one embodiment. The repository engine 356 may manage the collaboration with a number of service providers, internal or external to system landscape 300.

In one embodiment, dump metadata 360 describes the structure of the error dump files generated at one or more of the nodes of the computer system landscape 300. Further, the dump metadata 360 may include information about how and where the different nodes in the system landscape 300 generate and store the corresponding error dumps. In one embodiment, the runtime error manager 352 scans the nodes of the system landscape 300 for information relevant to particular kinds of program errors based on the descriptions in the dump metadata 360.

In one embodiment, storage 370 is used to persist different kinds of data, e.g., programming code, business data, the repository 354, etc. Workflow system 375 may provide inter-system communication within or outside the system landscape 300. In one embodiment, workflow system 375 may provide collaboration (including e-mail) services to the software modules executed either in the client systems 310 or in the server system 340. The runtime error manager 352 may use the services provided by the workflow system 375 to notify one or more of the users 305 associated with a particular software problem. Alternatively or additionally, the runtime error manager 352 may invoke other actions relevant to the occurrence of certain program errors, e.g., to initiate a workflow process to deal with the consequences of a program malfunction, to shut down the node of the computer system landscape where the problem has occurred, etc.

In one embodiment, the runtime error manager 352 provides an integrated mechanism for handling runtime errors. For example, complex scenarios for notification of responsible users or stakeholders about the registered errors may be configured and supported. The notification scenarios may involve sending notifications via different communication channels, e.g., instant messages, emails, alerts to mobile devices, etc. The runtime error manager 352 may be further configured to instantiate workflow processes in response to particular errors. The workflow processes may be instantiated in one or more workflow systems 375 via one or more communication channels. The runtime error manager 352 could be integrated with one or more of the messaging or workflow systems 375 to enable monitoring the progress of the runtime error handling. Additionally, different analyses of the registered errors may be performed, and various statistics may be generated by the runtime error manager 352.

In one embodiment, the runtime error manager 352 keeps data in solution repository 372 regarding the handling of the runtime errors registered in the computer system landscape 300. Such data may include information about how previous occurrences of the registered errors have been handled. Data about the progress of the notification or workflow processes related to runtime errors may also be stored in the solution repository 372. A user operating with the runtime error manager 352 may use keywords to extract information related to a particular runtime error from the solution repository 372.

A single runtime error may cause the generation of multiple, e.g., parallel, streams of operations handled by the runtime error manager 352 directed to one or more responsible users. The streams may include one or more notifications sent through different communication channels, one or more workflow processes instantiated in one or more workflow systems, one or more analytical transactions, storage read/write operations, etc. The different streams may have different priorities depending on provided preferences. Similarly, some runtime errors may be handled with higher priority than others.

The runtime error manager 352 may create a case based on the information for a runtime error in an error dump 362. The state of the created case may change in response to various events, e.g., based on feedback regarding any of the generated streams of operations. The state of the case could be informative for the progress of resolving the consequences of the encountered runtime error. The data related to the created cases may be stored in the solution repository 372. Similar runtime errors or different occurrences of a same runtime error may be aggregated and handled as a single case. Thus, when the runtime error manager 352 receives or extracts information for a new runtime error from an error dump 362, a check is performed whether a case for this type of runtime error has been previously created. If such case exists, the runtime error manager 352 may not invoke further actions, or may just report the status of the case.

Figure 4:
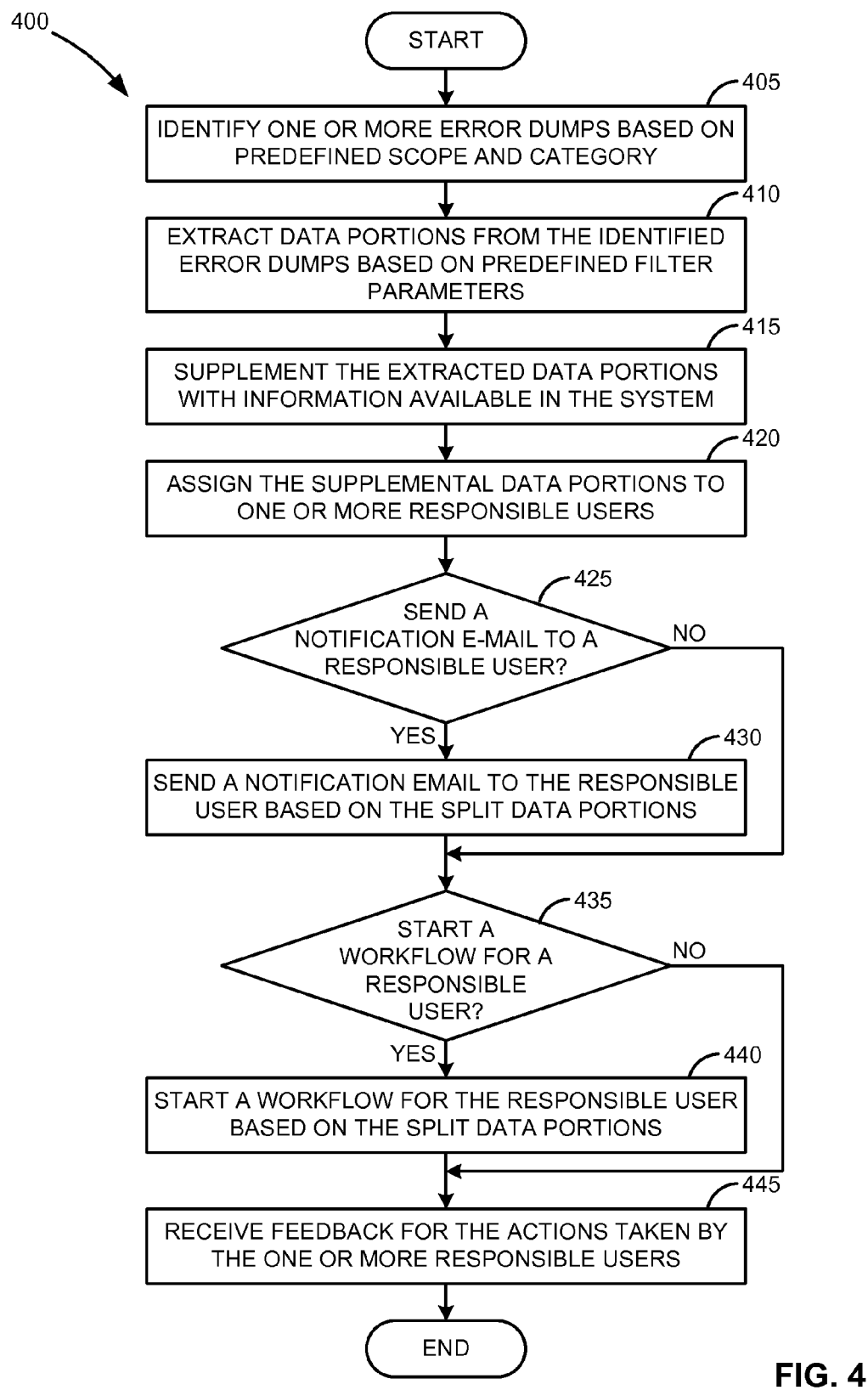
FIG. 4 illustrates a process for advanced management of runtime errors, according to one embodiment.

FIG. 4 shows process 400 for advanced runtime error management. In one embodiment, a runtime error manager executes the process 400 during runtime in one or more computer systems nodes in a computer system landscape. At 410, one or more error dumps are identified based on a predefined scope or a predefined category. The predefined scope and category may pertain to the properties of the errors, or to the characteristics of the programming components where the errors occur, or both. For example, the runtime error manager may identify only those error dumps that are generated for errors in a particular business software application, skip the error dumps created in response to system failures, omit error dumps created at client computer systems, etc.

At 410, data portions are extracted from the identified one or more error dumps based on predefined filter parameters. For example, the error dump may include abundant information regarding a particular software error, where the bulk of the information concerns the computer system executing the malfunctioned program. Most of the system information may not be relevant for correcting the error. In one embodiment, the advanced error management mechanism sends minimum information required for a particular software error to alert a responsible specialist. Based on the notification, the responsible specialist may extract the rest of the information directly from the respective error dump.

The extracted data portions of the identified error dumps are supplemented with additional information available in the system landscape, which are not included in the error dump at 415. In one embodiment, the supplemental information may be extracted from sources outside the system landscape, e.g., through internet services. In one embodiment, the extracted data portions are used as criteria to request or extract supplemental information. In such a case, the information additionally collected for an error may be added to the respective error dumps. Only part of the additional information may be used to supplement the data portions extracted from the error dumps.

The data portions, including the pertinent parts of the supplemental information, if any, are assigned to one or more responsible users at 420. Different mechanisms may be utilized to identify a user or a group of users responsible for the development, the maintenance, or the bug fixing of a particular software code part. For example, an association between the different software code modules and the responsible users may be stored in a metadata description. Other factors for deriving associations between error log parts and responsible users may apply. In one embodiment, the associations are evaluated by the runtime error manager and the data portions are automatically assigned to one or more users. Different parts of the data portions may be assigned to different users, e.g., the data portions are split between one or more users based on the associations.

Once the data portions, whether or not including supplemental information, are assigned, the responsible users are automatically notified via one or more predefined notification mechanisms. In one embodiment, at 425, a check is performed to determine whether there is a requirement to send a notification e-mail to a particular responsible user. If such requirement exists, the notification e-mail is generated based on the corresponding data portions and sent to the responsible user at 430.

Similarly, at 435, a check is performed to determine whether a workflow needs to be started for a responsible user. If yes, a corresponding workflow is started at 440 for the user based on the assigned data portions. For example, the workflow process may include generating a bug fixing ticket in a maintenance application based on the corresponding data portion of the respective error dumps, supplemented or not. The ticket may be addressed to the corresponding responsible user. The tasks represented by flowchart blocks 430 and 440 may be executed as separate work process streams by the advanced error management mechanism, either sequentially, or in parallel. The sequential or parallel execution may depend on predefined task priorities.

At 445, a feedback for the actions taken by the one or more responsible users may be received at the runtime error manager. For example, the feedback may include a confirmation that a responsible user has received a notification e-mail. In one embodiment, if feedback is not received from the notified users for a certain period of time, the notification may be repeated, or other action may be initiated.

Figure 5:
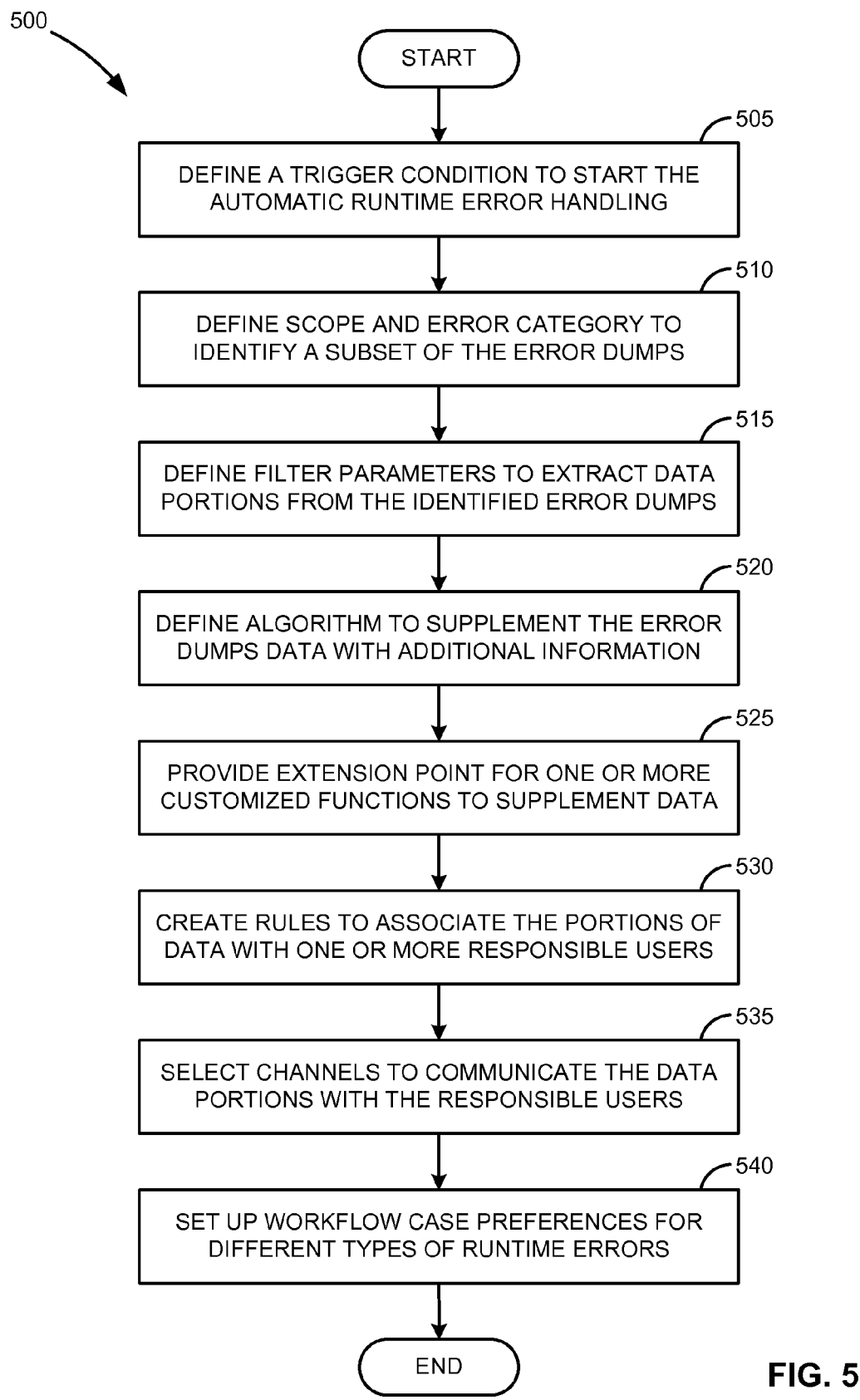
FIG. 5 illustrates a process for setup of a mechanism for managing runtime errors, according to one embodiment.

From process 400 it may be concluded that a number of predefined conditions are required for the proper execution of the runtime error management mechanism. In one embodiment, the runtime error management mechanism includes additional functionality to allow setting up the predefined conditions automatically or manually. FIG. 5 shows process 500 including a sequence of prerequisite actions necessary to setup a runtime error management mechanism, according to one embodiment.

At 505, a trigger condition is defined for the runtime error manager to start the advanced runtime error handling process. Different trigger conditions may be defined at 505 based on different criteria. For example, the automatic runtime error notification process may be launched as a result of specific user actions, system events, triggered by a particular error, etc. In one embodiment, a recurrent trigger condition is defined based on fixed or floating time periods.

A scope and category are defined at 510 to identify a subset of the error dumps generated in a system landscape. This action is necessary as the runtime error management process may not be concerned with all error dumps generated at the landscape computer systems. The scope may include properties like time when an error dump file is created, type and structure of the error dump files, etc. For example an error dump may be created as a plain text file, another like a database file. The category may be a technical characteristic of a type of error. Other factors that may impact the scope or the category of the error dumps may include, for example, characteristics of the software programs generating the error dumps, the severity of the failure, whether an error occurs in a core business application or some satellite program, etc. In one embodiment, different trigger conditions to start the automatic runtime error handling may be related to different scopes or categories of errors and error dumps. Thus, the runtime error management mechanism may be executed separately for the different scopes or categories.

At 515, filter parameters are defined to extract data portions from the identified error dumps. In one embodiment, an error dump may be filtered based on a number of different parameters. The generated error logs may include a lot of redundant data, or data that should not be directly communicated to users. Based on the filter parameters, the runtime error management mechanism will extract such portions of data that are meaningful either for solving the problem or for notifying the corresponding responsible users. Generally, the filter parameters may correspond to any of the characteristics of the data included in the error dumps. For example, filter parameters may correspond to one or more software objects included in a process thread call stack of an aborted software application. The type of the runtime errors may also define a filter parameter.

At 520, an algorithm is defined to supplement the data in the error dumps with additional information available within or reachable from the computer system landscape. The supplemental data may be used for different purposes. One possibility may be to associate the "raw" data included in a runtime error log with data from other sources to provide readable insight about the encountered software problem. For example, a problematic machine executable program code spooled in an error dump may be linked to a corresponding software component. Thus a responsible user may be notified with a readable program code of the software component, with information about a software package where the software component is stored, with information about a hierarchy level of the software component in a one or more software applications, etc. In one embodiment, the supplemental data may be used for defining one or more filter parameters at 515.

The information supplemented based on the algorithm defined at 520 may help to find an actual cause for runtime errors, e.g., in case of unprocessed exceptions. Based on the "raw" error dump data, relevant application data published within or outside the system landscape during runtime (e.g., similar to tracing) may be evaluated. Data for particular errors may be extracted from error description and classification databases. The reason for an error may be supplemented based on the error type, e.g., "syntax error", "uncaught exception", "computer error", etc.

In one embodiment, the runtime error management mechanism may provide an extension point for including one or more customized criteria or functions to supplement data relevant to specific programming errors at 525. The extension point is a technique to enhance the functionality of the runtime error manager to accommodate specific custom requirements which are not otherwise addressed.

The algorithm to supplement error dump data with additional information may concern the entire error dumps, or may relate only to data portions extracted from the error dumps, e.g., based on the filter parameters. In one embodiment, one part of the algorithm for supplementing data may apply to entire error dump files, and another part may apply only to one or more data portions of the error dumps.

In one embodiment, the runtime error management mechanism submits the right, focused and essential information to the right responsible person. Therefore, after defining scope, category, filter parameters, and the algorithm for supplementing data, rules are created at 530 to associate the portions of data to be extracted from the error dumps with one or more users responsible for fixing the encountered errors. Relevant parts of the data portions will be delivered to the responsible users. Different patterns for delivering relevant error dump information may exist. Table 1 below enlists some of the possible use case variants:

TABLE 1

| Delivery Use Case | Description |
| --- | --- |
| "Central Dispatcher" | The error information is sent to one or more users able to interpret the information on a higher level and dispatch the information to currently responsible persons or departments. |
| Developer Team focused | A whole team responsible for a certain domain of programs may be notified for runtime errors that have occurred in this domain. For example, the team may not be interested in any error, but only in errors caused by users who are not part of the team. |
| Single Developer focused | A single developer may schedule notification for errors concerning programs that are part of his responsibility. |
| Responsibility focused | Notification is resolved based on responsibility definition, where certain users are assigned as responsible for particular errors. Additionally, predefined responsible persons on program package and/or program component levels may be notified. |
| Administrator/ Quality focused | A quality manager, system administrator or other user with system maintenance responsibilities may be informed about certain malfunctions within a corresponding system. |

In one embodiment, some of the programs executed in a computer system are assigned to an owner, and possibly, to a package responsible. The term "package" in the context of this description addresses a group of programs in a specific area. A "package" may be an object having attributes like owner or responsible person. A package object may include a number of program objects having their own attributes, e.g., owner, responsible, etc. Hierarchy may exist among the programs grouped in a specific package. Thus, a package responsible user, and users responsible for programs on different hierarchy levels may be notified for an error related to a specific program.

The list of actual users to be notified for a particular runtime error may derive not only based on the assignments to programs or packages. The error dump files may also provide attributes that could be used to assign specific parts of an error dump to one or more responsible users. However, the direct assignments to the recipients may not be flexible enough to guarantee an efficient and timely runtime error notification. For example, a responsible user may be on vacation, a notification (or a workflow) may be addressed to a person who is no longer responsible for a particular program if the assignments are not regularly maintained, etc. Table 2 shows examples of rules that can help making the runtime error management more reliable by deriving additional users to be involved:

TABLE 2

| Derivation type | Derivation rule | Description |
|---|---|---|
| Replace Person | USER1, USER2 → SUBSTITUTE1, SUBSTITUTE2 | All notification content for persons USER1 or USER2 are redirected to SUBSTITUTE1 and SUBSTITUTE2 |
| Inform Additionally | USER1, USER2 → USER1, USER2, ADDITIONAL1, ADDITIONAL2 | All notification content for persons USER1 or USER2 are also sent to ADDITIONAL1 and ADDITIONAL2 |
| Team Equivalent | USER1, USER2, . . . ++ | Each notification to USER1 is also sent to USER2, and vice versa |
| Package Hook | PACKAGE1, PACKAGE2 → USER1, USER2 | All notification content assigned to package PACKAGE1 and PACKAGE2 is sent to USER1 and USER2 |
| Component Hook | COMP-A1, COMP-B* → USER1, USER2, USER3 | Notify USER1, USER2 and USER3 for all runtime-errors assigned to the components COMP-A1, and all components starting with COMP-B |

The initial setup of the runtime error management mechanism, as illustrated in FIG. 5, continues at 535 with selecting channels to communicate the extracted error information with the responsible users. Different communication channels may be selected, including e-mail notification, messenger service, system alerts, etc. In one embodiment, a particular workflow may be setup to start for a particular user when an assigned program module fails. Alternatively, a workflow may be setup to start based on the occurrence of a particular error, or based on failure of a particular system, etc. In one embodiment, the runtime error management mechanism may be bidirectional. For example, one or more channels may be selected to transfer information from the notified users to the runtime error manager (e.g., to provide feedback).

At 540, workflow case preferences for different types of runtime errors are set. For example, at this step the kind of process streams that will be instantiated in response to a particular type of runtime errors may be defined. This step may further include defining whether one or more workflow processes will be started and in which workflow systems. The priorities of the different process streams are also defined, as well as the priorities in handling different runtime errors. In one embodiment, the set up of the workflow case preferences may depend on the level of integration between the runtime error management mechanism and the one or more workflow systems available in the computer system landscape.

Figure 6:
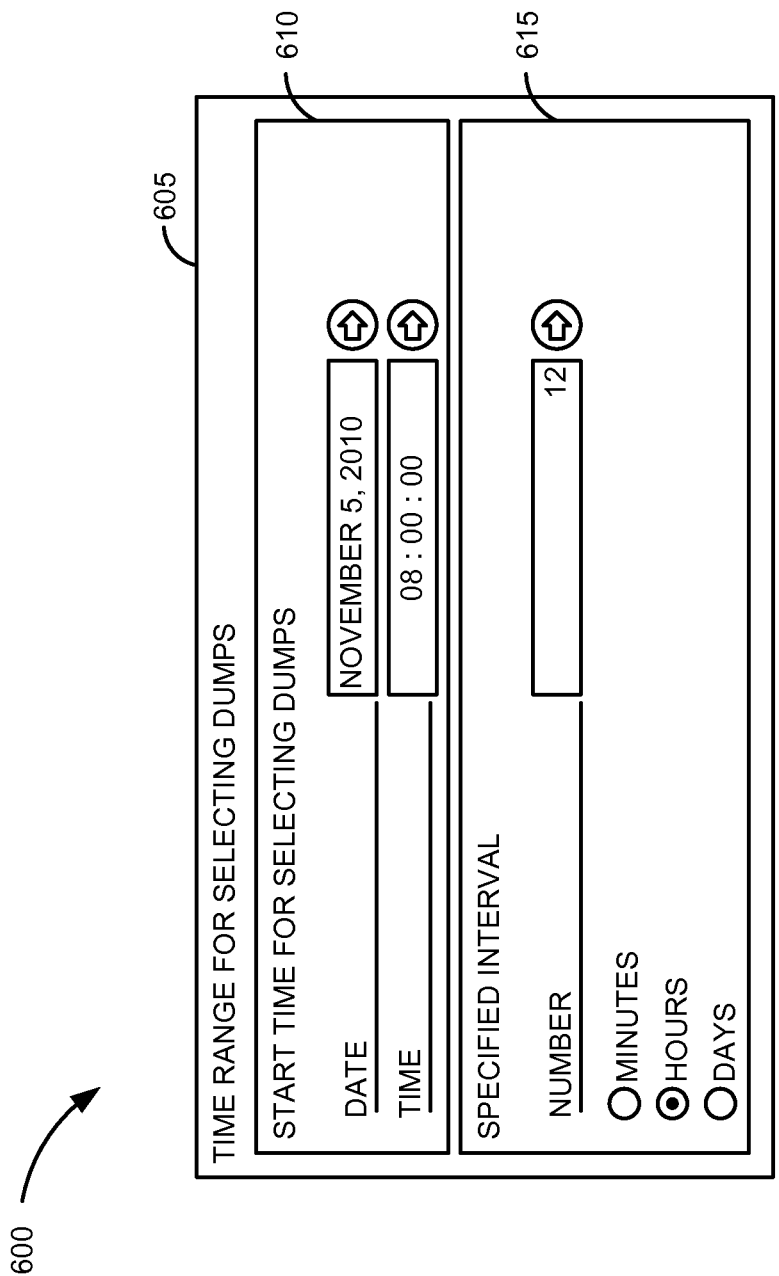
FIG. 6 illustrates an example graphical user interface (GUI) screen to setup a trigger condition for a runtime error manager, according to one embodiment.
Figure 7:
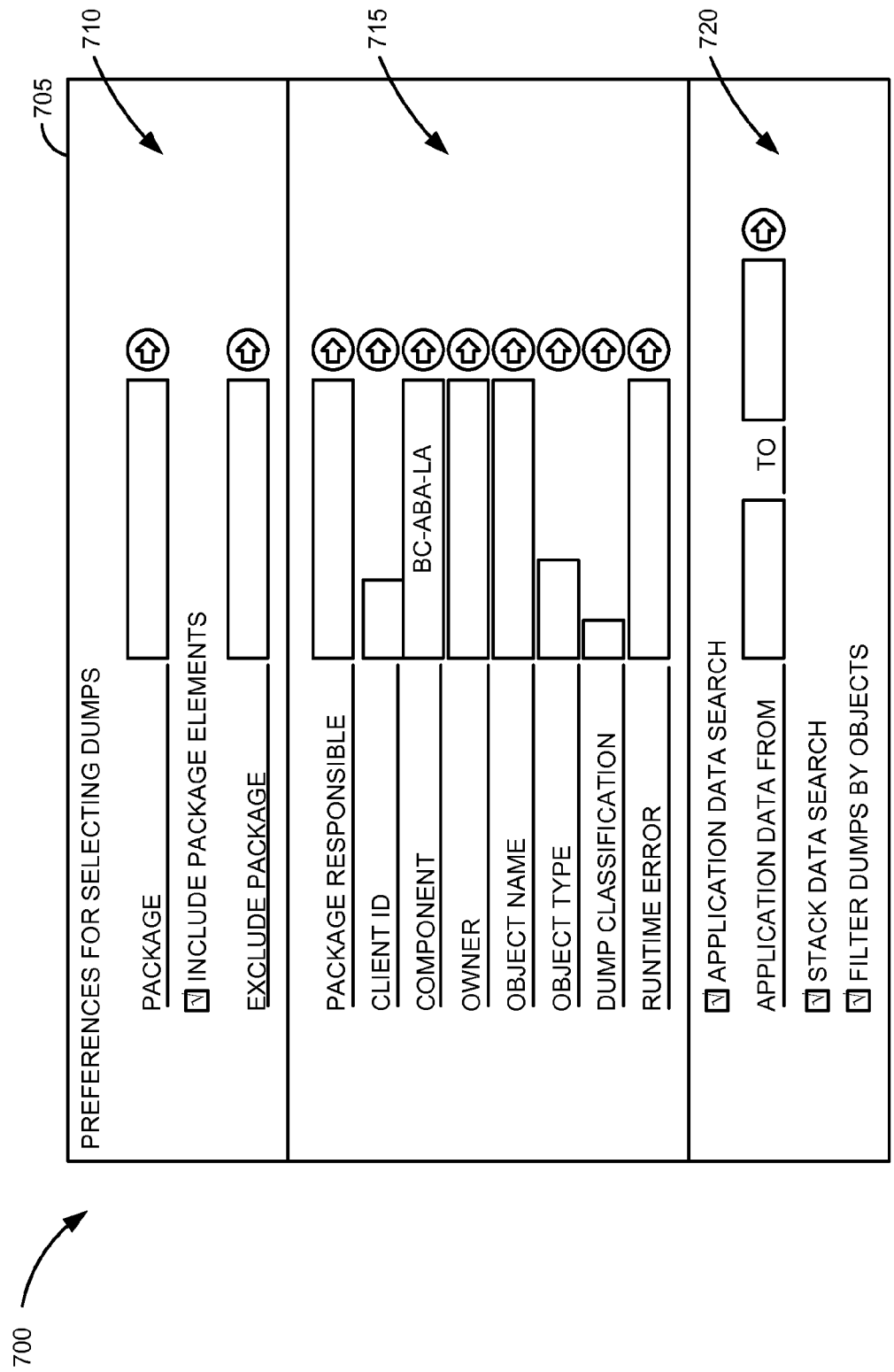
FIG. 7 illustrates an example GUI screen to setup error dump preferences of a runtime error manager, according to one embodiment.
Figure 8:
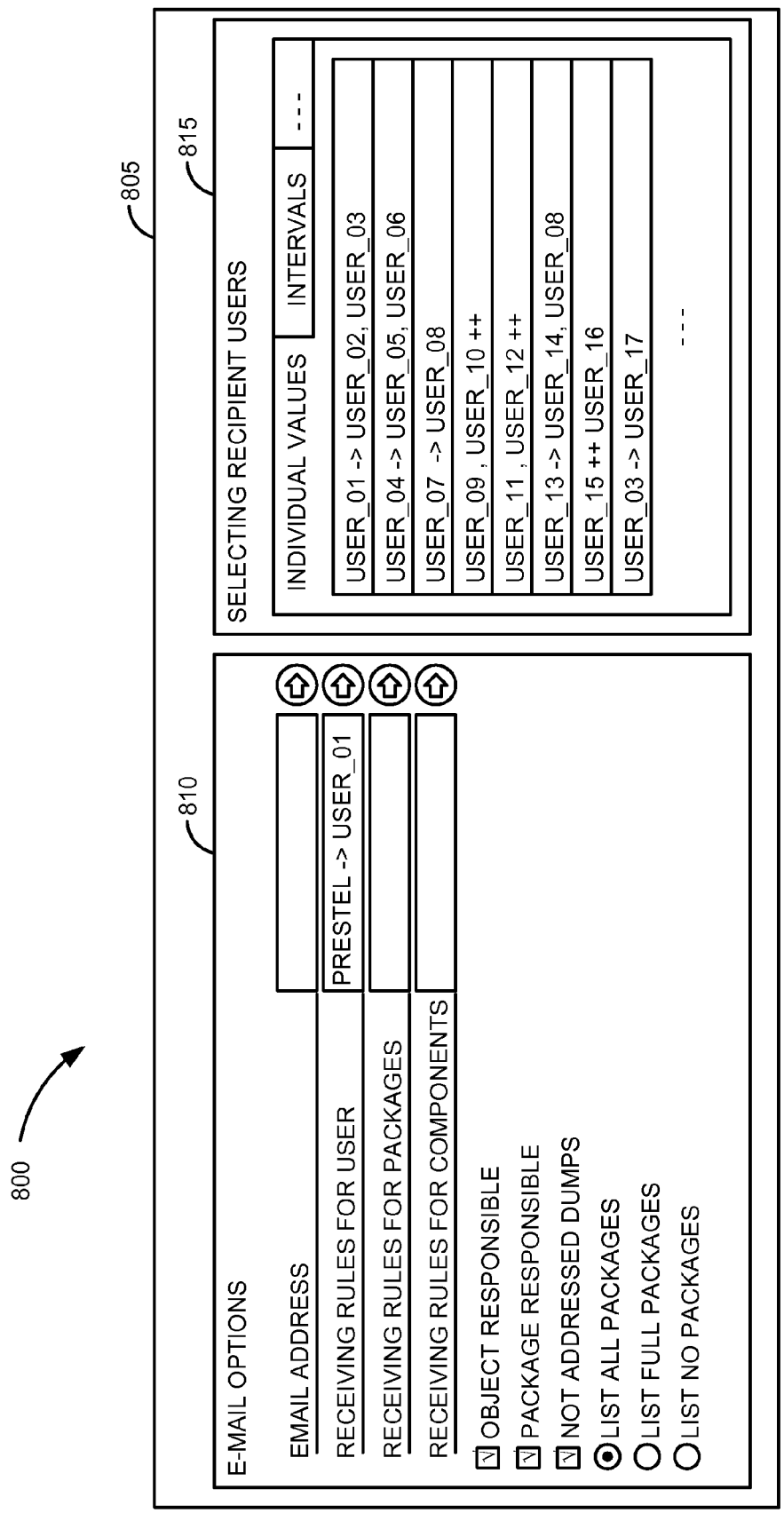
FIG. 8 illustrates an example GUI screen to setup rules for associating error dumps with responsible users, according to one embodiment.

FIG. 6, FIG. 7 and FIG. 8 show exemplary graphical user interface (GUI) screens 600, 700 and 800, respectively, providing means to setup a runtime error manager, according to one embodiment. The GUI screen 600 illustrated with FIG. 6 can be used to define a time-related condition for triggering the runtime error management. In the illustrated embodiment, the GUI screen 600 includes window "Time Range for Selecting Dumps" 605, separated in areas "Start Time for Selecting Dumps" 610 and "Specified Interval" 615. In area "Start Time for Selecting Dumps" 610, a starting date and time are specified to trigger the runtime error management process. In area "Specified Interval" 615, a period of time between triggering recurrent executions of the runtime error management process is defined. The period may be defined by number of minutes, hours, or days. Relevant data should be entered in at least one of the areas 610 and 615 to properly setup the time-related triggering condition for the management of runtime errors. In one embodiment, backward or forward intervals may be defined when scheduling the executions of the runtime error management process.

A number of parameters could be setup through GUI screen 700 to define either a scope and error category for selecting error dumps, or a filter to extract specific data portions from the selected error dumps, or both. The GUI screen 700 includes window "Preferences for Selecting Dumps" 705 separated in areas 710, 715 and 720. The area 710 includes controls specifying packages and package components to be present or absent in an error dump of interest. Respectively, an error dump may be selected if it contains a specified package, or excludes a specified package, or both.

The area 715 provides further controls to either identify pertinent error dump files or to filter the information in the error dumps. Exemplary set of parameters corresponding to the controls in the area 715 includes:

"Package Responsible"—an identification of a specific user associated with a program package related to an error dump of interest "Client ID"—the error dump files regarding a particular client may be included in (or excluded from) the runtime error management process "Component"—specifies a particular program component that should be associated with an error dump file, or with portions of one or more error dump files "Owner"—may identify an administrator or a developer responsible for fixing particular logged problems, e.g., related to the specified programming component "Object Name"—specifies a particular programming object to be affected by an encountered error "Object Type"—characterizing the programming structure "Dump Classification"—the error dumps may be separated in groups based on some criteria, e.g., error dump classes "Runtime Error"—to include (or exclude) a particular kind of runtime error from the management process, etc.

The area 720 specifies whether to examine application related data during the process of selecting and filtering error dump files. According to one embodiment, the application data may include business specific information as well as system specific data. Additionally, the available error dump files may be searched for stack data, and filtered by objects. The stack data may indicate the sequence of objects or methods created by inter object function calls in a software application execution thread.

In FIG. 8, the GUI screen 800 provides a user environment for defining rules to associate data portions of different error dumps with one or more responsible users, and also to setup an e-mail list of recipients. In the illustrated embodiment, areas "e-Mail Options" 810 and "Selecting Recipient Users" 815 are displayed together, e.g., in window 805 of GUI 800. The area "e-Mail Options" 810 provides various GUI controls, defining, for example:

"Recipient's e-Mail Address"—this is where the runtime error notifications will be sent "Receiving Rules for Users"—derivation rules for notifying additional users under certain circumstances "Receiving Rules for Packages"—errors notifications related to which packages to be sent "Receiving Rules for Components"—error notifications related to which program components to be sent to the recipient user or users Should predefined "Object Responsible" or "Package Responsible" users be notified for errors related to the corresponding program objects or packages Should automatic notifications for "Not Addressed Dumps" be sent What kind of information to be included in the notifications, e.g., "List All Packages", "List Full Packages" only, "List No Packages", etc.

The area "Selecting Recipient Users" 815 shows rules for substituting one recipient user with another, or for deriving additional recipients based on the original recipient. In one embodiment, the value for "Receiving Rules for Users" control in area "e-Mail Options" 810 is selected from the definitions provided in area "Selecting Recipient Users" 815.

In one embodiment, a notification message is generated based on Advanced Business Advanced Programming (ABAP) based error log, also called "short dump". ABAP is a high-level programming technology developed by SAP AG for creating an environment where various computer applications may be developed and executed. The short dumps error logs are generated in ABAP based computer system landscapes. In one embodiment, the short dumps are stored as database files. Usually, when a program executed in an ABAP based runtime environment aborts, a short dump is created and stored in a system table named SNAP. Generally, the short dump database files contain raw data stored as identifier (ID) and value pairs that is hard to read.

Figure 9:
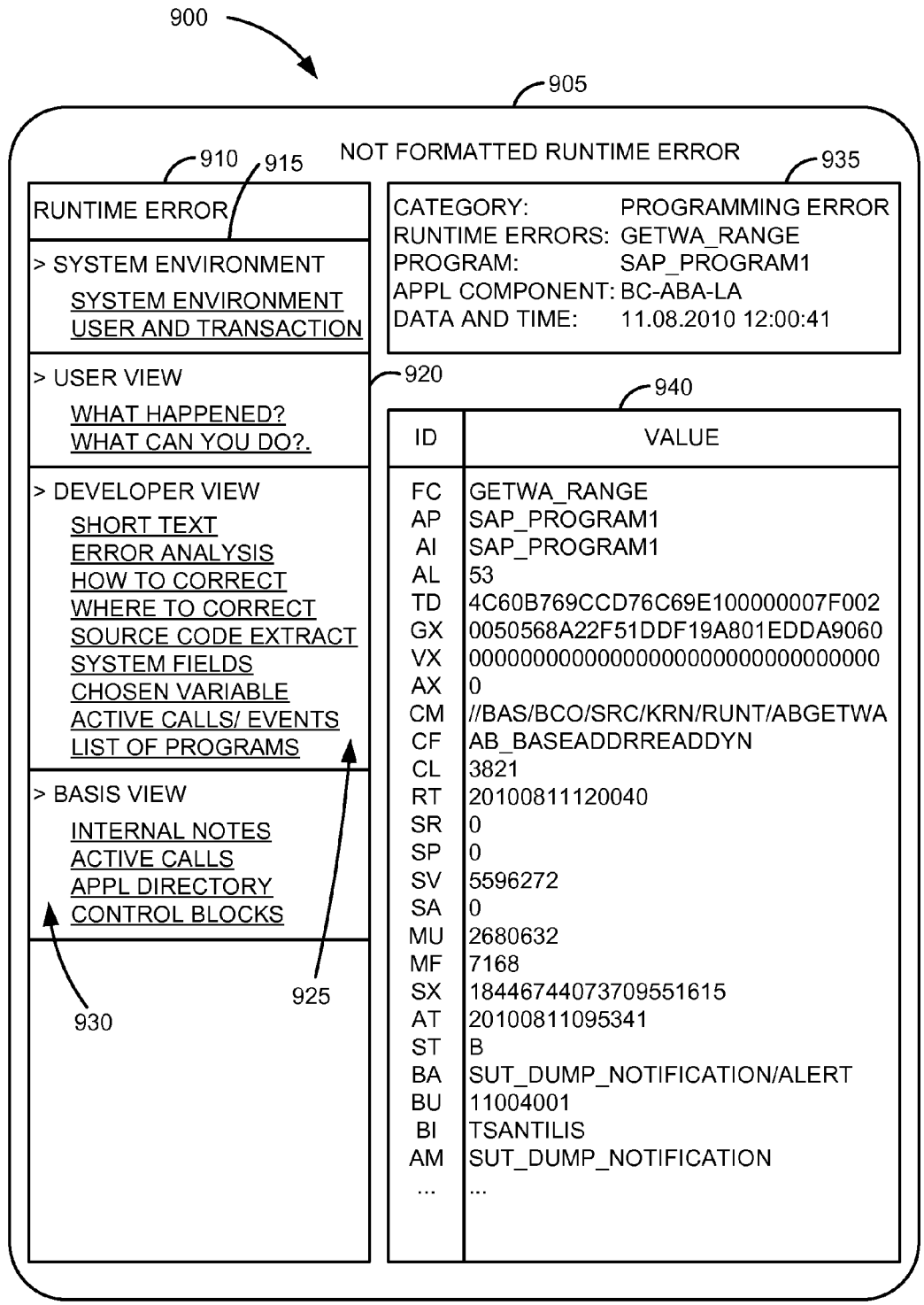
FIG. 9 illustrates an example GUI window displaying raw error dump data, according to one embodiment.

FIG. 9 shows raw short dump data 900 displayed in GUI window "Not Formatted Runtime Error" 905. The meaning of the information included in a short dump is presented in the left hand portion of window 905, in runtime error area 910. More specifically, links to different parts of the data in the short dump are included in the runtime error area 910. The links are grouped in "System environment" area 915, "User View" area 920, "Developer View" area 925, and "Basis View" area 930. Specific parts of the information in the short dump may be displayed in separate windows, or within window 905, by selecting one or more of the links in the areas 915 to 930.

General information about the runtime error in the short dump is provided in area 935. Details about the runtime error, as well as details about the runtime environment at the moment of the error are provided in ID/value pairs area 940. As illustrated in FIG. 9, the ID/value pairs include raw data, hard to be read by humans. Therefore, a translation of the meaning of the ID/value pairs raw data is necessary. In one embodiment, a transaction named "ST22" formats and displays the raw short dump data in a readable way for analysis.

Figure 10:
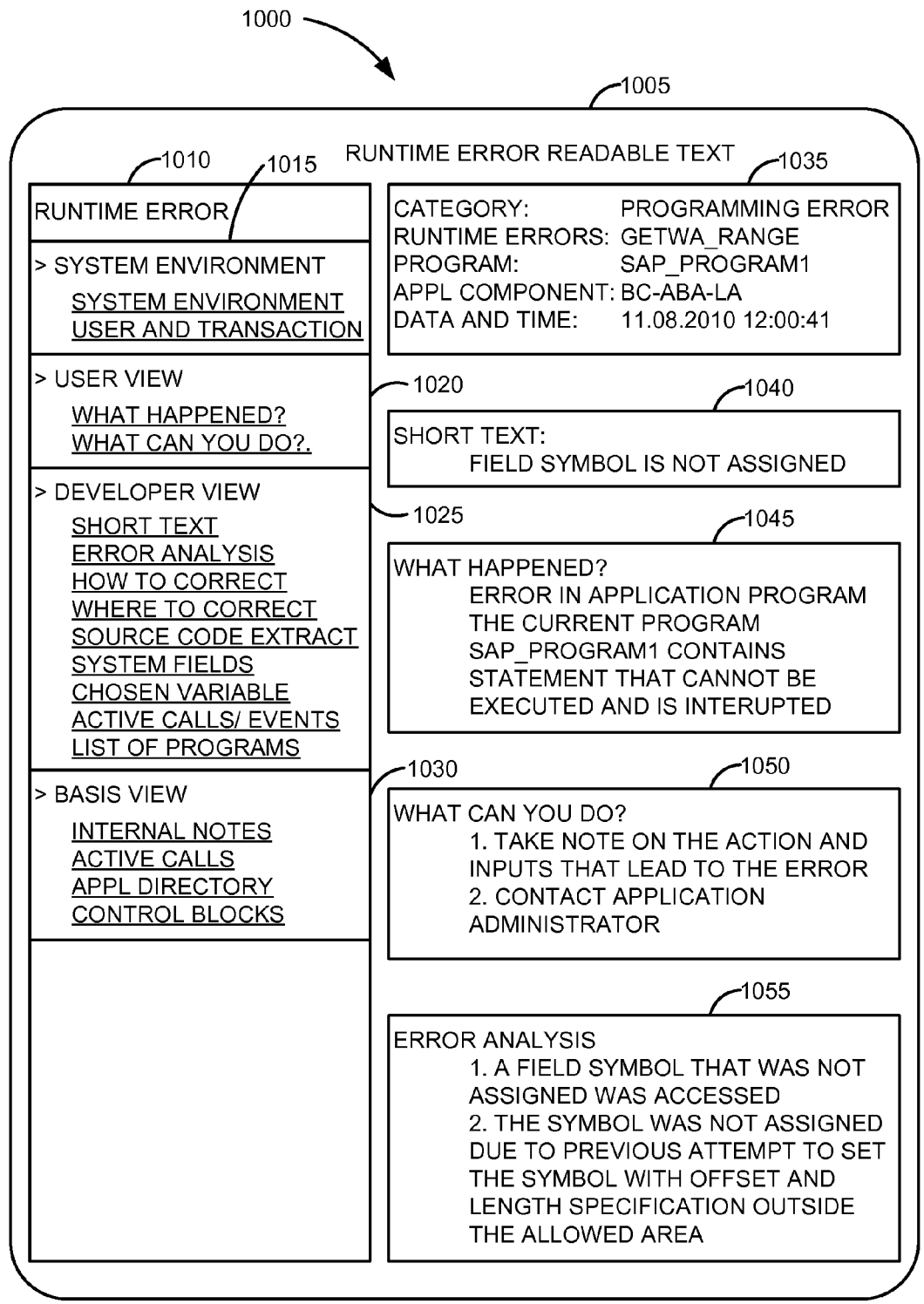
FIG. 10 illustrates an example GUI window displaying readable error dump data, according to one embodiment.

FIG. 10 shows short dump data 1000 displayed in readable form in window "Runtime Error Readable Text" 1005. Similarly to window "Not Formatted Runtime Error" 905 in FIG. 9, the "Runtime Error Readable Text" window 1005 also includes "Runtime Error" area 1010 where links to different parts of the data in the short dump are included. The links are respectively grouped in "System environment" area 1015, "User View" area 1020, "Developer View" area 1025, and "Basis View" area 1035. Area 1035 of window 1005 shows the general information about the runtime error in the short dump.

The difference between the information displayed in window 905 in FIG. 9 and the information displayed in window 1005 in FIG. 10 is visible in areas 1040, 1045, 1050 and 1055. The hard to read ID/value pairs are replaced by clear and concise text, e.g., explaining the runtime error situation, suggesting ways to fix the problem, etc. In one embodiment, the information included in the areas 1040 to 1055 may be related to one or more of the links in the areas 1015 to 1030. Different information may be displayed in the same or new areas by selecting different links.

The setup of a runtime error management mechanism may include definition of filtering queries for the short dump table to select specific runtime error related data portions. In one embodiment, the runtime error raw information can be retrieved using class CL_RUNTIME_ERROR defined in the ABAP based system environments. The CL_RUNTIME_ERROR class contains a number of useful methods, e.g.:

GET_FIELD_TABLE—provides the short dump table (ID/value pairs) for evaluation

GET_APPLICATION_CALLS—provides the application information written before runtime error occurred GET_ABAP_CALLSTACK—provides the chain of inter object calls GET_SHORT_DESCRIPTION—provides error related information GET_ABAP_SOURCEINFO—provides data relevant to program modules, etc.

Figure 11:
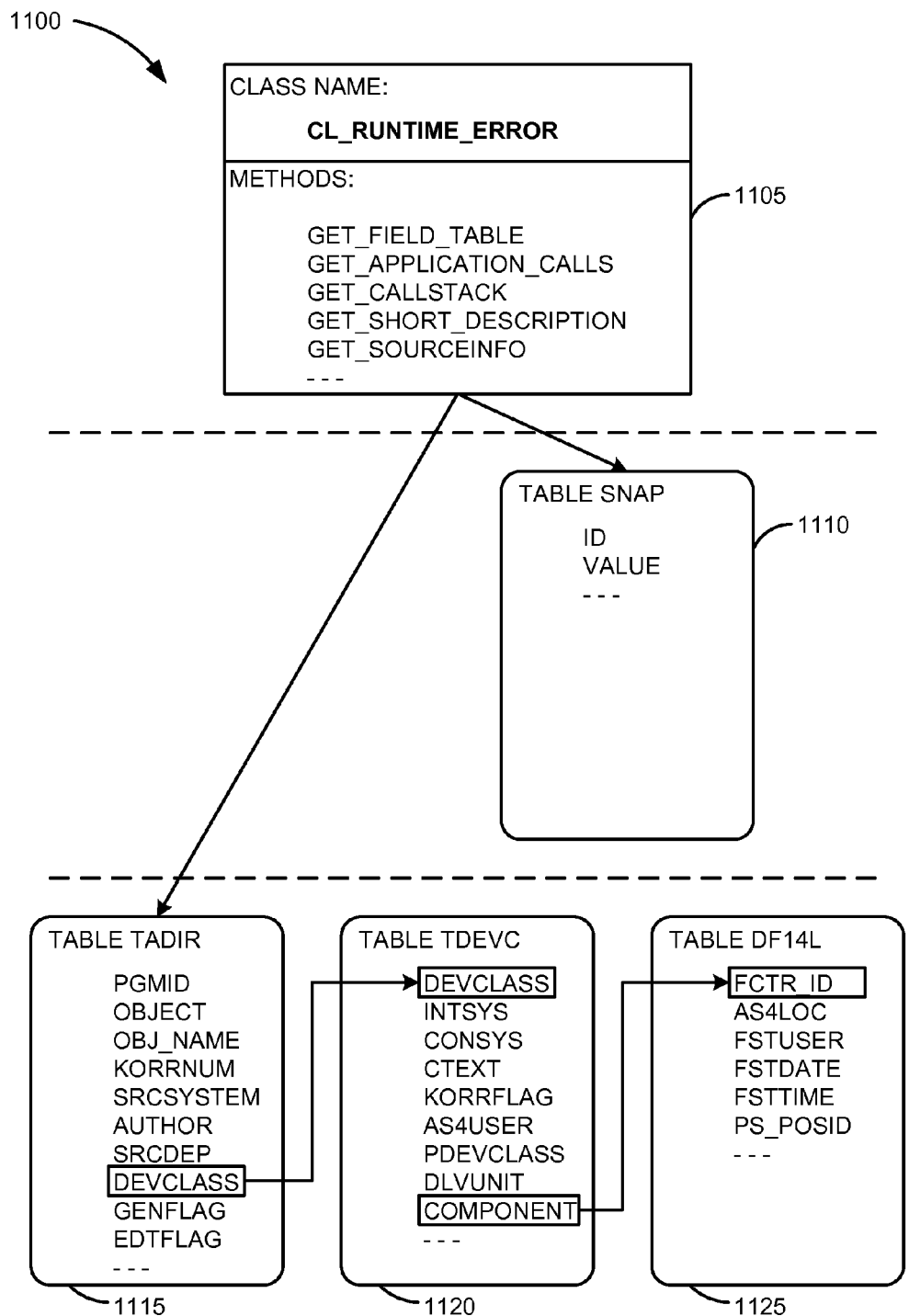
FIG. 11 is a block diagram illustrating access to error dump and reference metadata, according to one embodiment.

Generally, the programs executed in the ABAP program environment have access to reference metadata available in the ABAP object repository. FIG. 11 shows block diagram 1100 where CL_RUNTIME_ERROR class 1105 accesses both short dump "SNAP" table 1110, and ABAP repository "TADIR" table 1115. In one embodiment, the CL_RUNTIME_ERROR class 1105, or a similar object, can be used to extract error data from an error log file, e.g., the table 1110, and supplement additional information from a repository metadata, e.g., the table 1115. The "TADIR" table 1115 could be related to other repository tables, as illustrated with table "TDEVC" 1120 from where further supplemental information could be accessed. Similarly, table "TDEVC" 1120 is related with table "DF14L" 1125. The supplemental data may be used in determining recipient users to be notified about the error. Thus, data about a particular package, e.g., package responsible, could be retrieved from table "TADIR" 1115, and data about a particular program component where the error has occurred could be retrieved from tables "TDEVC" 1120 and "DF14L" 1125.

In ABAP technology context, a Business Add-In (BAdI) extension point may be used for additional data supplementation. Through such extended functionality, custom analysis and custom supplementation of runtime error data may be performed. In one embodiment, an active "CL_RUNTIME_ERROR" class instance could be passed to the externally extended functionality or program logic. The data supplemented via BAdI may be returned to the runtime error management mechanism for filtering, and/or to be included in the notification. Further, a responsible person or user to be notified could be determined through such extended functionality. The extensions are especially useful when access to additional application specific data related to the runtime error is provided.

In one exemplary embodiment, a runtime error manager implemented on a node of a computer system landscape is setup to run at every 12 hours after 8 o'clock in the morning on Nov. 5, 2010, as shown in FIG. 6. During the iterations, the manager identifies one or more error dumps available at one or more nodes of the computer system landscape. The identification of the error dumps is based on predefined scope and error criteria. The runtime error manager extracts portions of data from the identified error dumps that meet predefined filter parameters. As illustrated in FIG. 7, the scope and error criteria, as well as the filter parameters are predefined to include software component "BC-ABA-LA". Accordingly, the runtime error manager extracts only data about runtime errors related to software component "BC-ABA-LA" from the available error dumps.

The raw data extracted from the error dumps is usually supplemented with information available in the computer system landscape. Various methods of the "CL_RUNT- IME_ERROR" class may be used to extract additional information available in the computer system landscape to supplement the data portions extracted from the identified error dumps. Additionally, a BAdI extension point may be used for additional data supplementation, e.g., by disposing "CL_RUNTIME_ERROR" class instances to external programs. The instances of the "CL_RUNTIME_ERROR" class are corresponding to one or more runtime errors included in the error dumps.

In the example, the raw error dump data is supplemented with information about the call stack, e.g., the chain of procedure calls across a number of related software components. The particular software package where the software component "BC-ABA-LA" is included may also be added to the extracted data portions, if not referred directly in the error dumps. The owners and the responsible persons for the software component and the corresponding package are identified based on the metadata available in the computer system landscape. Other users may be also identified, like system administrators, software developers of particular program objects, etc.

The runtime error in the example has been related to software component "BC-ABA-LA" included in package "SABP_CORE". The package responsible user is "Prestel", and the owner of the software component is user "Kochu". The data portions extracted from the corresponding error dump are supplemented with additional data and are assigned to one or more of the identified users. Different sets of the supplemented data portions may be assigned to different users. For example, the package responsible user (e.g., "Prestel") may receive an aggregated report for the runtime errors encountered during the 12 hours period related to the corresponding package (e.g., "SABP_CORE"). On the other hand, the software component owner (e.g., "Kochu") may receive details for every single error associated with the respective software component (e.g., "BC-ABA-LA").

The different sets of the supplemented data portions may be sent to the assigned users via different communication channels, and using different forms of representation, e.g., raw data, readable data, etc. The package responsible user may receive an email with the aggregated runtime error report after each iteration of the runtime error manager, or once in several iterations. The software package owner may receive an instant message informative for the number and frequency of the runtime errors with every iteration of the runtime error mechanism or tool. A workflow process may be initiated for an administrator user to correct the consequences from a particular runtime error based on the data portions extracted from the error dump.

Usually, rules are set for the runtime error manager to notify other users in addition to the identified users responsible for the development or maintenance of the affected software objects. As illustrated in FIG. 8, when user "Prestel" has to be notified for an error, user "USER_01" is also notified based on the receiving rules for the user as defined in area 810. Further, when user "USER_01" has to be notified, users "USER_02" and "USER_03" are also notified based on recipient selecting rules in area 815. Therefore, when software component "BC-ABA-LA" encounters a runtime error, the runtime error manager notifies users "Kochu", "Prestel", "USER_01", "USER_02" and "USER_03" with relevant sets of the extracted data from the respective error dump files.

The advanced mechanism for managing runtime errors is executed based on the setup provided to notify the right personnel about errors or malfunctions in the software systems running in the respective computer system landscapes. The runtime error management mechanism may inform the users about particular type of errors only, or different users may receive notifications for groups of different errors. FIG. 12 shows a notification message 1200 communicated between a runtime error manager and a recipient user, according to one embodiment. The message 1200 could be sent via e-mail or other communication channels. The notification message 1200 includes basic information for a number of errors. The information in the message 1200 is sufficient for the recipient user to take appropriate measures for further analyzing and fixing the problem.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via the various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 13:
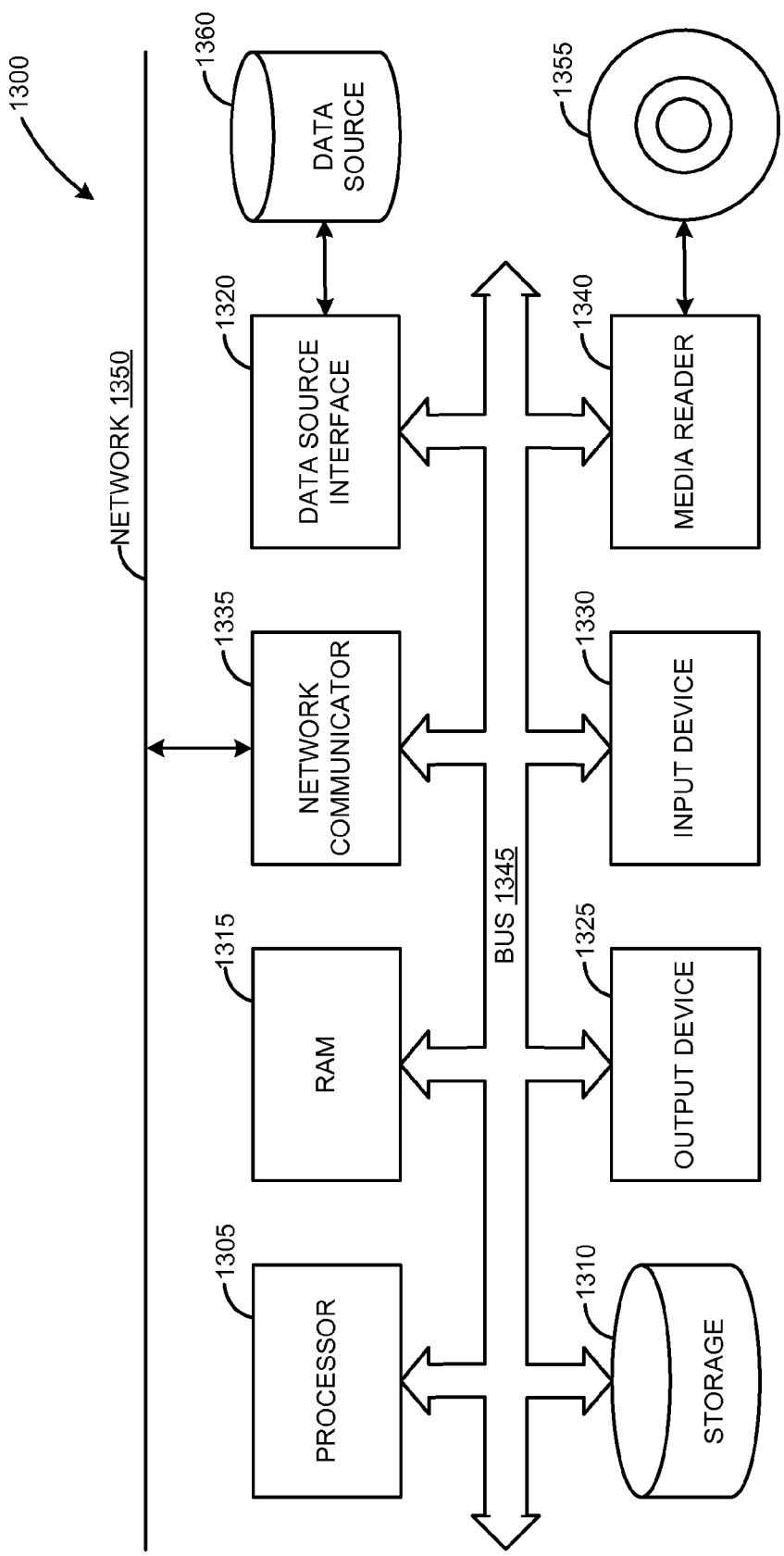
FIG. 13 is a block diagram of an exemplary computer system to execute advanced management of runtime errors, according to one embodiment of the invention.

FIG. 13 is a block diagram of an exemplary computer system 1300. The computer system 1300 includes a processor 1305 that executes software instructions or code stored on a computer readable storage medium 1355 to perform the above-illustrated methods of the invention. The computer system 1300 includes a media reader 1340 to read the instructions from the computer readable storage medium 1355 and store the instructions in storage 1310 or in random access memory (RAM) 1315. The storage 1310 provides a large space for keeping static data where at least some instructions could be stored for later execution. The stored instructions may be further compiled to generate other representations of the instructions and dynamically stored in the RAM 1315. The processor 1305 reads instructions from the RAM 1315 and performs actions as instructed. According to one embodiment of the invention, the computer system 1300 further includes an output device 1325 (e.g., a display) to provide at least some of the results of the execution as output including, but not limited to, visual information to users and an input device 1330 to provide a user or another device with means for entering data and/or otherwise interact with the computer system 1300. Each of these output devices 1325 and input devices 1330 could be joined by one or more additional peripherals to further expand the capabilities of the computer system 1300. A network communicator 1335 may be provided to connect the computer system 1300 to a network 1350 and in turn to other devices connected to the network 1350 including other clients, servers, data stores, and interfaces, for instance. The modules of the computer system 1300 are interconnected via a bus 1345. Computer system 1300 includes a data source interface 1320 to access data source 1360. The data source 1360 can be accessed via one or more abstraction layers implemented in hardware or software. For example, the data source 1360 may be accessed via network 1350. In some embodiments the data source 1360 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer system for management of runtime errors comprising:
a memory to store computer instructions; and
a processor coupled to the memory to execute the computer instructions to:
identify an error dump from a plurality of error dumps based on a preference, wherein the plurality of error dumps is generated in response to a plurality of runtime errors encountered in at least one computer system node of a computer system landscape,
receive a data portion of the error dump based on a filter,
assign the data portion of the error dump to a responsible user based on a predefined rule created to assign at least a part of the data portion to the responsible user associated with a program component, and
instantiate a process stream based on the data portion directed to the responsible user via a communication channel.

2. The system of claim 1, wherein identifying the error dump from the plurality of error dumps comprises:
scheduling a time condition to trigger an execution of automatic runtime error notification, wherein the time condition is based on one or more of a fixed trigger time and recurrent time intervals.

3. The system of claim 1, wherein assigning the data potion to a responsible user comprises:
reading a reference metadata to identify an association between the data portion or and the responsible user.

4. The system of claim 1, wherein instantiating the process stream comprises:
creating an electronic message based on the data portion to be sent via a communication channel, or generating a workflow process for the responsible user.

5. The system of claim 1, receiving the data portion of the error dump comprises:
send to a database a database query based on the filter to select the at least one data portion from the error dump, where the error dump is stored on the database.

6. The system of claim 1, wherein assigning the data portion of the error dump to the responsible user comprises:
supplementing the data portion of the error dump with one or more of information available in the computer system landscape and information received from an external computer system.

7. the system of claim 6, wherein instantiating the process stream based on the data portion directed to the responsible user comprises:
creating the notification to the responsible user based on the supplemented information.

8. An article of manufacture including a non-transitory computer readable storage medium to tangibly store instructions for management of runtime errors, which when executed by a computer, cause the computer to:
- identify at least one error dump based on a preference, wherein the at least one error dump is generated in response to at least one runtime error encountered in at least one computer system node of a computer system landscape;
- extract at least one data portion from the at least one error dump based on a filter, wherein extracting the at least one data portion from the at least one error dump comprises:
  - generating a database query based on the filter to select the at least one data portion from the at least one error dump generated in the at least one computer system node, where the at least one error dump is stored in a database, and
  - sending the database query to the database;
- assign at least a part of the at least one data portion to at least one responsible user in the computer system landscape based on a predefined rule; and
- instantiating a work process directed to the at least one responsible user for the at least one runtime error, wherein the at least one process stream is based on at least the part of the at least one data portion of the error dump.

9. The article of manufacture of claim 8, wherein the non-transitory computer readable storage medium tangibly stores further instructions, which when executed by the computer cause the computer to:
- supplement the at least one data portion of the at least one error dump with information available in the computer system landscape or received from a computer system external to the computer system landscape.

10. The article of manufacture of claim 8, wherein identifying the at least one error dump comprises:
- defining one or more of a scope and error category to select the at least one error dump from a plurality of error dumps generated in the computer system landscape, wherein the scope specifies a file characteristic of the at least one error dump, and the error category specifies a kind of error.

11. The article of manufacture of claim 8, wherein extracting the at least one data portion from the at least one error dump comprises:
- defining at least one filter parameter to identify the at least one data portion in the at least one error dump, wherein the at least one filter parameter specifies a property of a program component.

12. The article of manufacture of claim 8, wherein assigning at least the part of the at least one data portion to the at least one responsible user comprises:
- creating the predefined rule to assign at least the part of the at least one data portion to a user associated with a program component.

13. The article of manufacture of claim 8, wherein assigning at least the part of the at least one data portion to the at least one responsible user comprises:
- creating the predefined rule to replace the assigned at least one responsible user with at least one substitute user, or to add at least one additional user to the assigned at least one responsible user.

14. The article of manufacture of claim 8, wherein instantiating the work process directed to the at least one responsible user for the at least one runtime error comprises:
- generating a plurality of workflow process streams for the responsible user;
- managing an execution of the plurality of workflow process streams at one or more workflow systems based on predefined priorities; and
- receiving a feedback information from the at least one responsible user informative for a progress of the execution of the plurality of workflow process streams.

15. A computerized method for managing runtime errors comprising:
- at a computer memory, receiving a data portion of an error dump based on a filter, wherein the error dump is generated in response to a runtime error encountered at a computer system node of a computer system landscape;
- supplementing the data portion of the error dump with information available in the computer system landscape or received from a computer system external to the computer system landscape;
- identifying at least one responsible user in the computer system landscape associated with at least a part of the data portion of the error dump based on the supplemented information;
- creating an electronic notification for the at least one responsible user utilizing a processor, wherein the notification is based on at least the part of the data portion of the error dump associated with the at least one user; and
- communicating the electronic notification with the at least one responsible user using at least one communication channel.

16. The method of claim 15 further comprising:
- creating the notification for the at least one responsible user using a processor, wherein the notification is based on the supplemented information.

17. The method of claim 15 further comprising:
- exposing an extension point to execute external program logic upon the data portion during identifying the at least one responsible user or during creating the notification for the at least one responsible user.

18. The method of claim 15, wherein receiving the data portion of the error dump comprises:
- selecting the error dump from a plurality of error dumps based on a preference, wherein the plurality of error dumps is generated in response to at least one runtime error encountered in least one computer system node of the computer system landscape.

19. The method of claim 18 further comprising:
- receiving at least one parameter value specifying the preference for selecting the error dump.

20. The method of claim 15, wherein receiving the data portion of the error dump comprises:
- generating a data request in response to one or more of a time schedule, system event and user input, wherein the time schedule specifies backward or forward time intervals to request error dump data, and wherein the system event is a runtime error occurrence.

* * * * *